United States Patent
Koo

(10) Patent No.: US 7,782,791 B2
(45) Date of Patent: Aug. 24, 2010

(54) METHOD OF REPORTING CHANNEL QUALITY IN EGPRS SYSTEM

(75) Inventor: Hyounhee Koo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 327 days.

(21) Appl. No.: 11/969,843

(22) Filed: Jan. 4, 2008

(65) Prior Publication Data

US 2008/0165696 A1 Jul. 10, 2008

(30) Foreign Application Priority Data

Jan. 5, 2007 (KR) ...................... 10-2007-0001489

(51) Int. Cl.
*H04L 12/26* (2006.01)

(52) U.S. Cl. ....................... 370/252; 370/333

(58) Field of Classification Search ................ 370/252, 370/315–322, 331–333, 346–349, 204, 212, 370/213, 215; 455/67.11, 67.13, 277.2, 516, 455/517, 522; 375/331, 332, 333, 340

See application file for complete search history.

(56) References Cited

U.S. PATENT DOCUMENTS

| | | | | |
|---|---|---|---|---|
| 6,256,486 B1 * | 7/2001 | Barany et al. | ............... | 455/296 |
| 6,728,228 B1 * | 4/2004 | Ostman et al. | ............... | 370/332 |
| 6,859,499 B2 * | 2/2005 | Hashimoto | ............. | 375/240.27 |
| 7,471,928 B2 * | 12/2008 | Axnas et al. | ................... | 455/69 |
| 2003/0026238 A1 * | 2/2003 | Baills et al. | ................. | 370/347 |
| 2003/0054850 A1 * | 3/2003 | Masseroni et al. | .......... | 455/522 |
| 2004/0166887 A1 * | 8/2004 | Laroia et al. | ................ | 455/522 |
| 2004/0219926 A1 | 11/2004 | Kim et al. | | |
| 2005/0233754 A1 | 10/2005 | Beale | | |
| 2006/0120470 A1 | 6/2006 | Hwang et al. | | |
| 2006/0291591 A1 * | 12/2006 | Ghosh | ......................... | 375/340 |
| 2007/0189199 A1 * | 8/2007 | Nishio | ........................ | 370/328 |

FOREIGN PATENT DOCUMENTS

WO    WO 2005-060132 A1    6/2005
WO    WO2005/060132 A1 *   6/2005

* cited by examiner

*Primary Examiner*—Kwang B Yao
*Assistant Examiner*—Andrew Lai
(74) *Attorney, Agent, or Firm*—Lee, Hong, Degerman, Kang & Waimey

(57) ABSTRACT

There is provided a method of enabling a mobile station to report channel quality in a wireless communication system. The method includes receiving a radio block allocated for a control block, the control block having a header and a control message, the header having an identifier, measuring channel quality for the radio block allocated for the control block when the identifier identifies the mobile station, and reporting the channel quality. A mobile station can report channel quality for its own control block.

10 Claims, 9 Drawing Sheets

FIG. 5

| Bit | | | | | | | | |
|---|---|---|---|---|---|---|---|---|
| 8 | 7 | 6 | 5 | 4 | 3 | 2 | 1 | Octet |
| TFI | RRBP | | ES/P | | USF | | | 1 |
| BSN1 | | | PR | | TFI | | | 2 |
| ⋮ | | | | | | | | 3 |
| | | | | | | | | 4 |
| | | | | | | | | 5 |

FIG. 7

| Bit | | | | | | | | |
|---|---|---|---|---|---|---|---|---|
| 8 | 7 | 6 | 5 | 4 | 3 | 2 | 1 | |
| Payload Type | | RRBP | | S/P | USF | | | MAC header |
| PBSN | RTI | | | | | FS | AC | Octet 1(optional) |
| PR | | TFI | | | | | D | Octet 2 |
| RBSNe | | | FSe | spare | | | | Octet 2/3(optional) |
| Control Message Contents | | | | | | | | Octet M ⋮ Octet 21 Octet 22 |

METHOD OF REPORTING CHANNEL QUALITY IN EGPRS SYSTEM

CROSS-REFERENCE TO RELATED APPLICATIONS

This application claims the benefit of priority of Korean Patent Application No. 10-2007-0001489 filed on Jan. 5, 2007, which is incorporated by reference in its entirety herein.

BACKGROUND

1. Technical Field

The present invention relates to wireless communication, and more particularly, to a method of reporting channel quality, which can reduce error caused by wireless channel environment.

2. Related Art

The GSM (Global System for Mobile communication) is a radio technology which has been developed as a system for standardizing radio communication systems in Europe and which has widely been deployed all over the world. The GPRS (General Packet Radio Service) is introduced to provide a packet switched data service in a circuit switched data service provided from the GSM. The EDGE (Enhanced Data Rate for GSM Evolution) employs the 8-PSK (Phase Shift Keying) instead of the GMSK (Gaussian Minimum Shift Keying) employed in the GSM. The EGPRS (Enhanced General Packet Radio Service) represents the GPRS using the EDGE.

The physical channel dedicated to GPRS/EGPRS traffic is called Packet Data Channel (PDCH). Logical channels such as Packet Common Control Channel (PCCCH), Packet Data Traffic Channel (PDTCH) and Packet Associated Control Channel (PACCH) are mapped to the PDCH. The PCCCH is used for control signaling necessary for initiating packet transfer. The PDTCH is used to transmit user data. The PACCH is used for dedicated signaling.

Unlike a GSM system, an EGPRS system provides multiple data rates. For example, data is transmitted at nine different data rates over the PDTCH. In a process called 'link adaptation', the data rate is adjusted based on channel condition. When the channel condition is good, data can be transmitted at higher data rates. Conversely, when the channel condition is poor, data is transmitted at slower data rates. Transmitting data using a particular modulation and coding scheme (MCS) at a data rate that is too high for the channel condition may result in a loss of data. Link adaptation increases overall data throughput by using highest data rate that can dependably be supported using a particular MCS at given channel condition.

In the EGPRS system, a mobile station needs to report channel quality to a base station. The channel quality between the base station and the mobile station is expressed in terms of a bit error probability (BEP). The BEP is the expected value of the actual Bit Error Rate (BER) of a signal received by the mobile station over the wireless channel. The base station selects appropriate MCS depending on the reported channel quality. Link adaptation can most effectively be performed when the channel quality is reported a BEP that most accurately estimates the actual BER. The BEP is measured by burst-by-burst.

In the EGPRS system, user data and control message may use different modulation scheme. For example, a PDTCH for the user data is modulated with Gaussian Minimum Shift Keying (GMSK) or octal-Phase Shift Keying (8-PSK). A PACCH for the control message is only modulated with GMSK. When the PDTCH is continuously modulated with 8-PSK and a mobile station measures a BEP for the PDTCH, the base station may select inappropriate MCS because the mobile station only reports the BEP based on 8-PSK.

A method is sought for determining a BEP that can represent various channel condition. Moreover, a method is sought for improving efficiency of link adaptation by reporting a BEP that can represent various channel condition.

SUMMARY

Methods and apparatuses of reporting channel quality in the EGPRS system are provided herein.

In one aspect, there is provided a method of enabling a mobile station to report channel quality in a wireless communication system. The method includes receiving a radio block allocated for a control block, the control block comprising a header and a control message, the header comprising an identifier, measuring channel quality for the radio block allocated for the control block when the identifier identifies the mobile station, and reporting the channel quality.

In another aspect, there is provided a method of receiving channel quality in a wireless communication system. The method includes transmitting a radio block allocated for a control block, the control block comprising a header and at least one control message, the header comprising a identifier which identifies a mobile station to report channel quality, and receiving channel quality for the radio block from the mobile station.

In still another aspect, there is provided a method of enabling a mobile station to report channel quality in a wireless communication system. The method includes receiving a control block on Packet Associated Control Channel (PACCH) and a data block on Packet Data Traffic Channel (PDTCH), the control block comprising a header and a control message, the header of the control block comprising a identifier, the data block comprising a header and upper layer data, the header of the data block comprising the identifier, measuring channel quality for the PACCH and PDTCH when the identifier identifies the mobile station, and reporting the channel quality.

In still another aspect, there is provided a wireless device including a RF (Radio Frequency) unit for transmitting and receiving radio blocks, and a processor coupled to the RF unit and configured to measure channel quality of a radio block for a control block, the control block comprising a header and at least one control message, the header comprising a identifier which identifies a mobile station.

BRIEF DESCRIPTION OF THE DRAWINGS

FIG. 5 illustrates a RLC/MAC block header for data transmission.

FIG. 7 shows an example of a downlink RLC/MAC control block.

DESCRIPTION OF EXEMPLARY EMBODIMENTS

Figure 1:
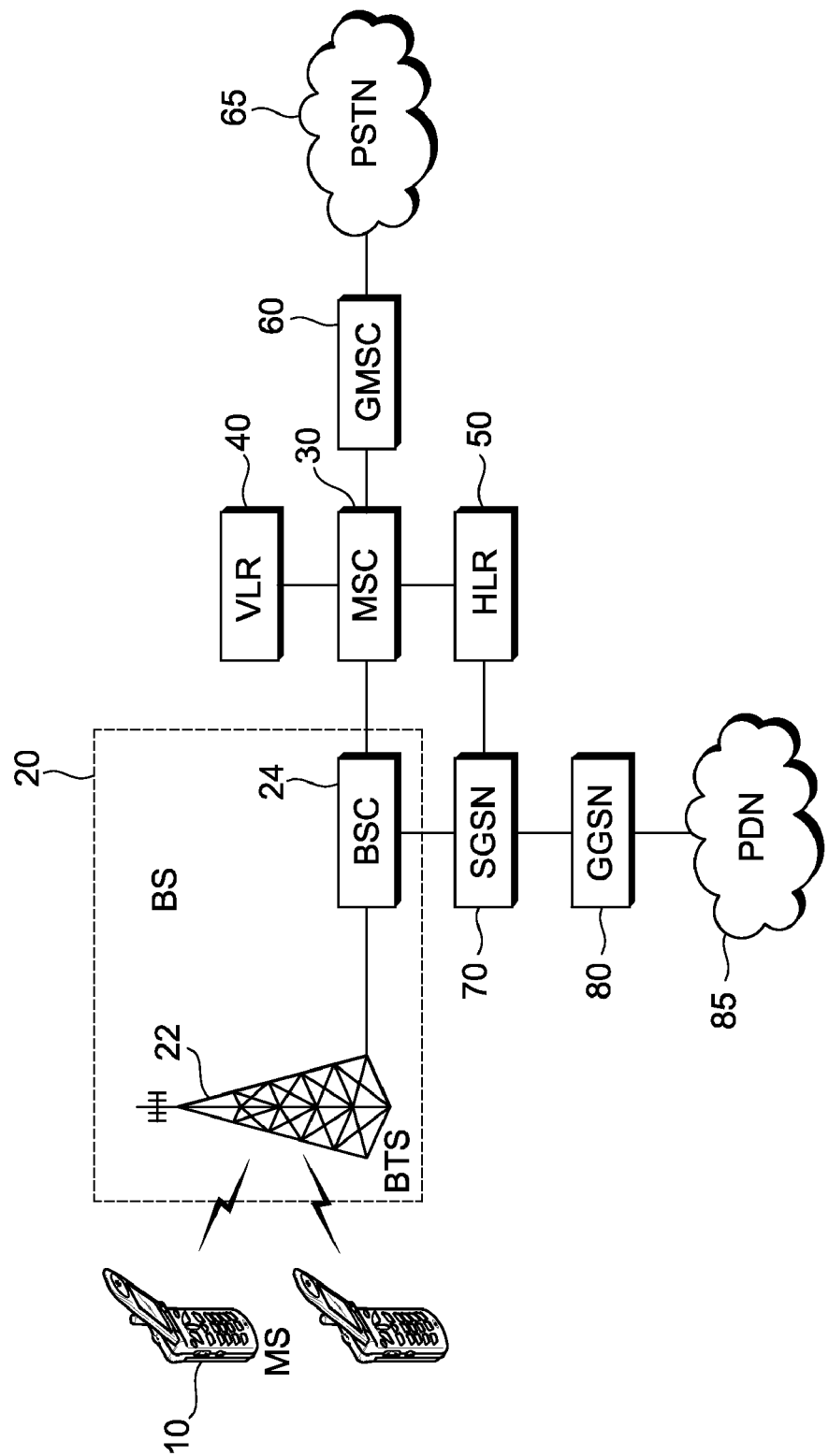
FIG. 1 is a block diagram illustrating a wireless communication system.

FIG. 1 is a block diagram illustrating a wireless communication system. This shows a network based on the GPRS (General Packet Radio Service)/EGPRS (Enhanced General Packet Radio Service). The wireless communication systems are widely used to provide a variety of communication services of voice, packet data, and so on.

Referring to FIG. 1, a mobile station (MS) 10 refers to a communication instrument carried by a user and may also be called other terms such as a UE (User Equipment), a UT (User Terminal), a SS (Subscriber Station), and a wireless device.

A base station (BS) 20 includes a base transceiver station (BTS) 22 and a base station controller (BSC) 24. The BTS 22 communicates with the MS 10 in a cellular area through a radio interface and a synchronization function with the MS 10. The BSC 24 interfaces at least one BTS 22 with a mobile switching center (MSC) 30. The BS 20 may be called as a base station subsystem, a Node-B, and an access point.

The MSC 30 connects the BS 20 to a different kind of network such as the PSTN (Public Switching Telephone Network) 65 or the PLMN (Public Land Mobile Network) through the GMSC (Gateway MSC) 60. A VLR (Visitor Location Register) 40 stores temporary user data, which includes information on the roaming of all the MSs 10 in a service area of the MSC 30. An HLR (Home Location Register) 50 includes information on all the subscribers in the home networks. An SGSN (Serving GPRS Support Node) 70 takes charge of mobility management of the subscribers. A GGSN (Gateway GPRS Data Network) 80 routes a packet at the current position of the MS 10 to interface the MS with an external packet data network such as PDN (Public Data Network) 85.

A temporary block flow (TBF) is a logical connection offered by two Medium Access Control (MAC) entities so as to support the unidirectional transfer of Radio Link Control (RLC) Protocol Data Unit (PDU) on basic physical subchannels. The TBF is not provided in a packet idle mode. In the packet idle mode, any radio resource on a packet data physical channel is not assigned to the MS. At least one TBF is provided in a packet transfer mode. In the packet transfer mode, radio resources on one or more packet data physical channels for the transfer of packet data are assigned to the MS. The MAC-idle state means a MAC-control-entity state where no basic physical subchannel is assigned. A Temporary Flow Identity (TFI) is assigned to each TBF by the network. The MS assumes that the TFI value is unique among concurrent TBFs in the same direction (uplink or downlink) on all Packet Data Channels (PDCHs) used for the TBFs. The same TFI value may be used concurrently for TBFs on other PDCHs in the same direction and for TBFs in the opposite direction.

Figure 2:
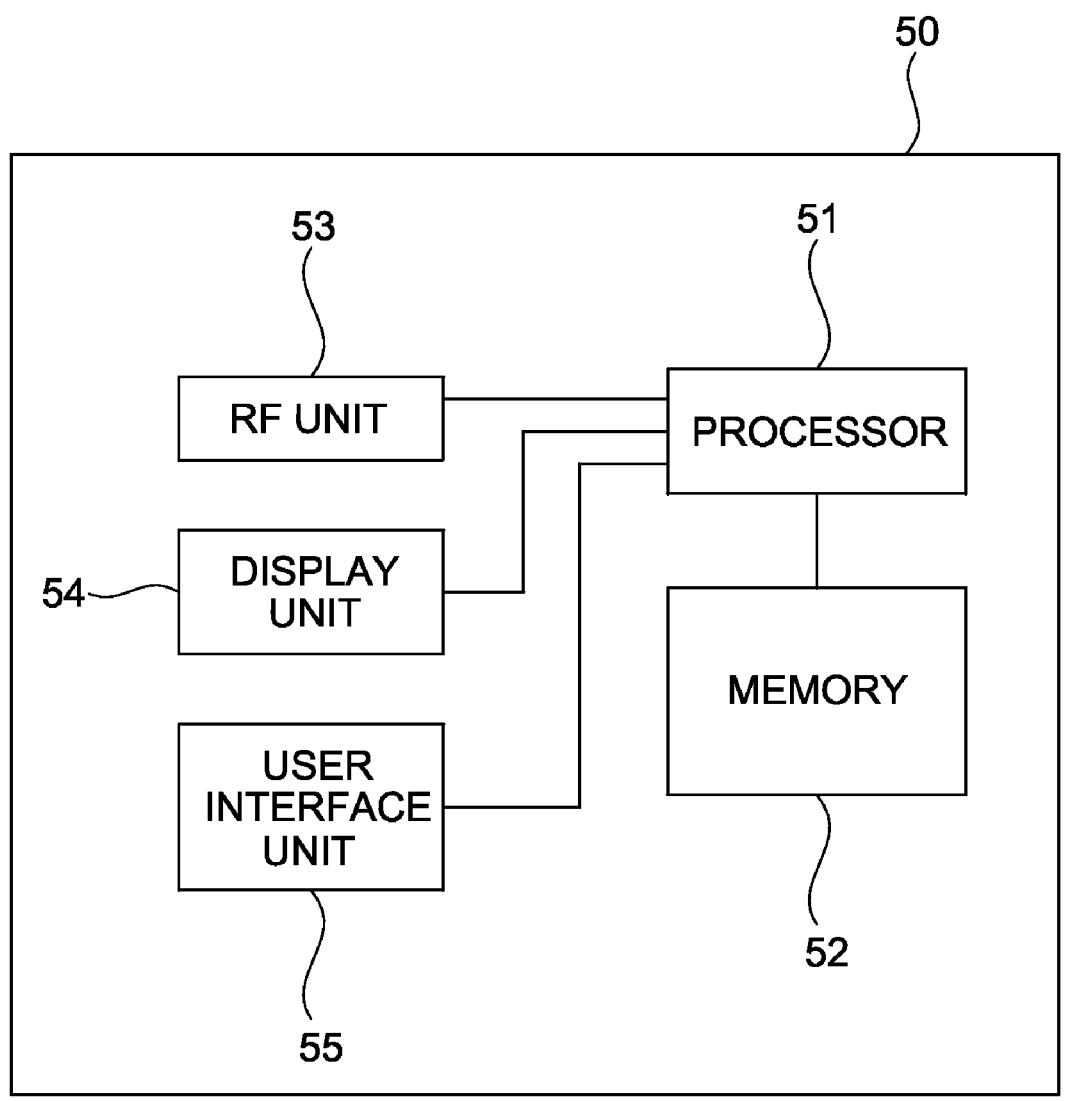
FIG. 2 is a block diagram showing elements of a mobile station.

FIG. 2 is a block diagram showing elements of a mobile station. A mobile station includes a processor 51, memory 52, a RF unit 53, a display unit 54, and a user interface unit 55. The memory 52 is connected to the processor 51 and stores a MS driving system, applications and general files. The display unit 54 displays various pieces of information of the MS and may employ well-known devices such as a Liquid Crystal Display (LCD) or an Organic Light Emitting Diode (OLED). The user interface unit 55 may consist of a combination of well-known user interfaces such as a keypad and a touch screen. The RF unit 53 is connected to the processor and transmits/receives a radio signal.

The processor 51 implements functions of a radio link control (RLC) layer and a medium access control (MAC) layer. The processor generates a data block (for example, a RLC/MAC block or a RLC/MAC control block), which is transmitted through a radio block. The processor 51 measures channel quality with respect to each radio block and sends the measurement result to a BS.

Figure 3:
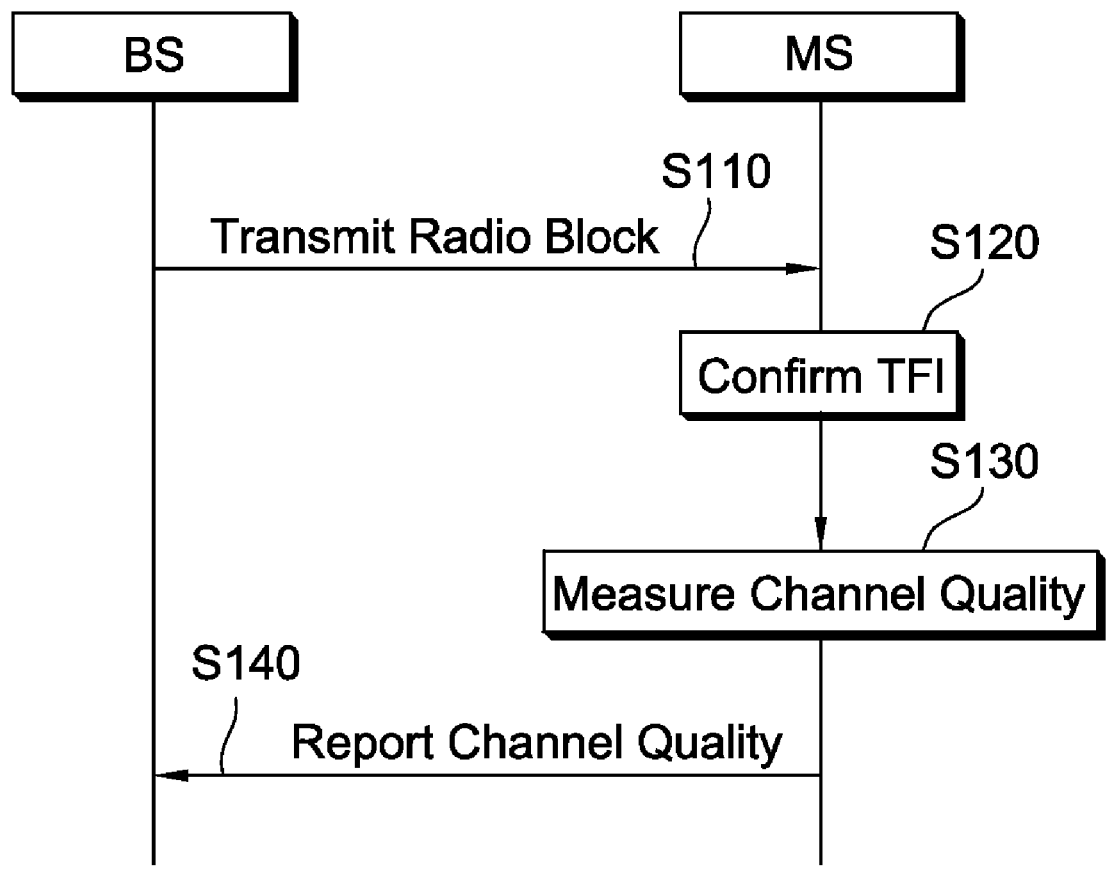
FIG. 3 is a flowchart illustrating a method of reporting channel quality according to an embodiment of the present invention.

FIG. 3 is a flowchart illustrating a method of reporting channel quality according to an embodiment of the present invention.

Referring to FIG. 3, a BS (or a network) transmits a radio block to a MS (S110). This becomes a packet transfer mode. The radio block may be allocated to a data block or a control block. The data block includes a header and an upper layer data, and the control block includes a header and a control message. In a wireless communication system, the control message is needed to communicate between the BS and the MS. The control message includes a Modulation and Coding Scheme (MCS) index, information for allocated radio resources and so on. The control block has to be transferred before the data block is transferred in order to determine a bandwidth, a modulation scheme of the data block, etc.

The physical channel dedicated to GPRS/EGPRS traffic is called Packet Data Channel (PDCH). Logical channels such as Packet Data Traffic Channel (PDTCH) and Packet Associated Control Channel (PACCH) are mapped to the PDCH. The data block is transmitted on the PDTCH and the control block is transmitted on the PACCH.

The MS determines whether the received radio block includes an identifier that belongs to itself (for example, a TFI belonging to itself) (S120). While an EGPRS downlink TBF is transmitted, the MS measures a received signal quality. The signal quality is measured with respect to the own radio block. The MS determines whether the radio block refers to itself based on the TFI.

The MS indicated by the TFI measures channel quality (S130). The MS measures the channel quality of a radio block including a TFI. The MS measures the signal quality of each channel burst-by-burst. A criterion for channel quality measurement may include a Bit Error Probability (BEP). The BEP includes a mean BEP and a coefficient of variation of the BEP (CV BEP). The BEP is measured with respect to all possible modulation schemes. For example, assuming that a system supports Gaussian minimum shift keying (GMSK) and 8-phase shift keying (8-PSK), the mean BEP and the CV BEP are measured with respect to each of the GMSK and 8-PSK.

The MS reports the measured channel quality to the BS (S140). The MS may report channel quality through the PACCH. The BS can determine a MCS through a reported channel quality and inform the MS of the determined MCS.

Figure 4:
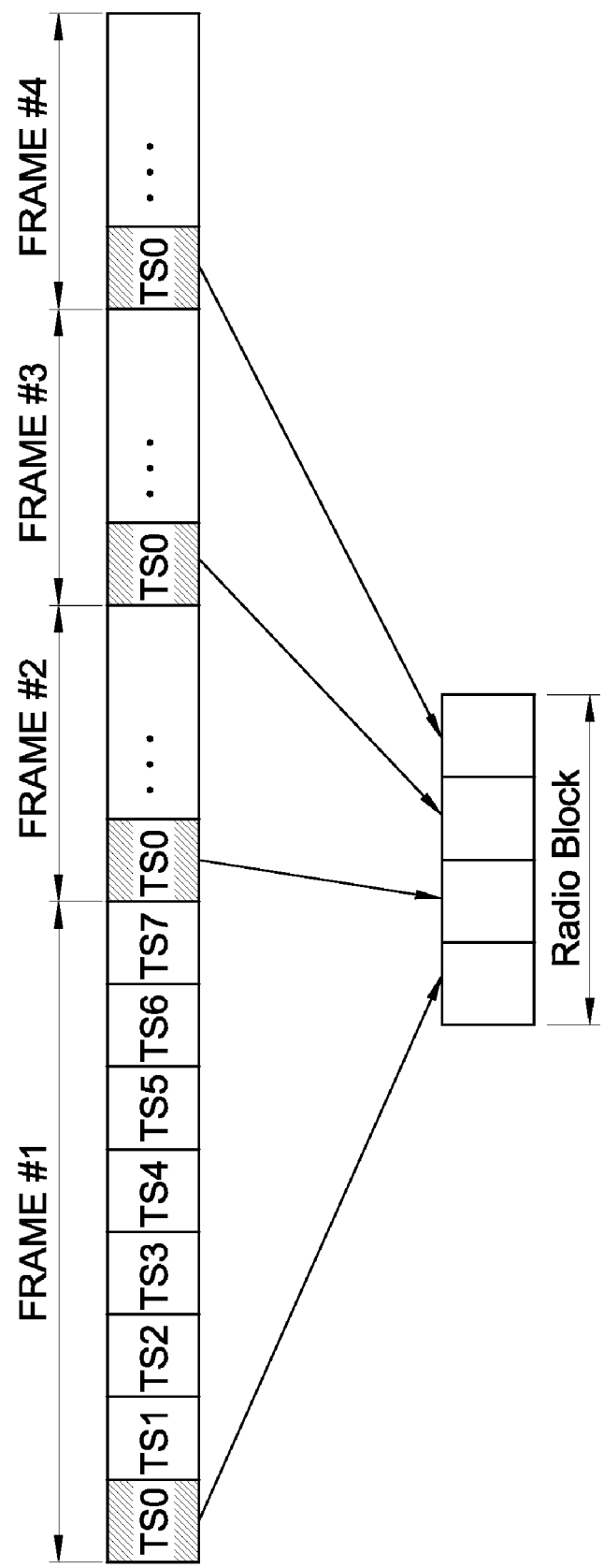
FIG. 4 shows how to generate a radio block.

FIG. 4 shows how to generate a radio block.

Referring to FIG. 4, in the EGPRS system, one frame is comprised of eight timeslots TS0, TS1, . . . , TS7. A radio block consists of four consecutive timeslots belonging to different frames. For example, the radio block may include the first timeslot TS0 of each of the four consecutive frames.

A mean BEP for one radio block can be expressed as shown $$\text{MEAN\_BEP}_{block} = \frac{1}{4}\sum_{i=1}^{4} BEP_{burst\,i} \qquad \text{[Equation 1]}$$

where $BEP_{burst\,i}$ denotes a BEP for an i-th burst. The burst refers to information transmitted on a timeslot.

A CV BEP for a radio block can be expressed as shown $$\text{CV\_BEP}_{block} = \frac{\sqrt{\frac{1}{3}\sum_{k=1}^{4}\left(BEP_{burst\,k} - \frac{1}{4}\sum_{i=1}^{4} BEP_{burst\,i}\right)^2}}{\frac{1}{4}\sum_{i=1}^{4} BEP_{burst\,i}} \qquad \text{[Equation 2]}$$

Channel quality is calculated by averaging the BEP for each radio block per channel and per modulation scheme. The reliability of filtered quality parameters for each modulation type $R_n$ is defined as shown $$R_n = (1-e)\cdot R_{n-1} + e\cdot x_n,\ R_{-1}=0 \qquad \text{[Equation 3]}$$

where n is the iteration index, incremented per each downlink radio block, e is the forgetting factor, and $x_n$ denotes the existence of quality parameters for a n-th block for the respective modulation type, i.e. if the radio block is intended for this MS. $x_n$ values 1 and 0 denote the existence and absence of quality parameters, respectively. The forgetting factor e can be defined according to reporting period of the BEP.

An n-th quality parameter can be expressed as shown $$\text{MEAN\_BEP\_TN}_n = \qquad \text{[Equation 4]}$$
$$\left(1 - e\frac{x_n}{R_n}\right)\cdot \text{MEAN\_BEP\_TN}_{n-1} + e\frac{x_n}{R_n}\cdot \text{MEAN\_BEP}_{block,n}$$

$$\text{CV\_BEP\_TN}_n = \qquad \text{[Equation 5]}$$
$$\left(1 - e\frac{x_n}{R_n}\right)\cdot \text{CV\_BEP\_TN}_{n-1} + e\frac{x_n}{R_n}\text{CV\_BEP}_{block,n}$$

The quality parameters are channel quality for one timeslot per frame of the radio block.

In the EGPRS system, a number of timeslots may be allocated to the MS. Therefore, the mean BEP and the CV BEP per modulation scheme can be averaged over the entire channels (timeslots) as shown $$\text{MEAN\_BEP}_n = \frac{\sum_j R_n^{(j)}\cdot \text{MEAN\_BEP\_TN}_n^{(j)}}{\sum_j R_n^{(j)}} \qquad \text{[Equation 6]}$$

$$\text{CV\_BEP}_n = \frac{\sum_j R_n^{(j)}\cdot \text{CV\_BEP\_TN}_n^{(j)}}{\sum_j R_n^{(j)}} \qquad \text{[Equation 7]}$$

where n denotes an iteration index at reporting time and j denotes the channel number. When entering packet transfer mode or MAC-Shared state and/or when selecting a new cell, the filters shall reset the values of n to 0. When a new timeslot is assigned for a downlink TBF, the filters shall reset the values, $\text{MEAN\_BEP\_TN}_{n-1}$, $\text{CV\_BEP\_TN}_{n-1}$ and $R_{n-1}$ to 0 for this timeslot.

The MS can report the overall MEAN_BEP and CV_BEP for the modulations, the GMSK and/or 8-PSK (i.e. the GMSK_MEAN_BEP, the GMSK_CV_BEP; and/or 8PSK_MEAN_BEP, 8PSK_CV_BEP, respectively) for which it has received blocks on at least one allocated channel (timeslot) since it last sent a measurement report to the network. Additionally, the MS can report per slot measurements (MEAN_BEP_TNx) according to what the network has ordered.

After the MS determines whether an identifier belonging to itself is included in a radio block (for example, the TFI is included in the header of a data block or a control block), the MS reports channel quality for the radio block. Channel quality for a radio block is reported when the radio block carries a TFI indicating itself. RLC/MAC block structures for data transmission and control message transmission may differ.

Figure 5:
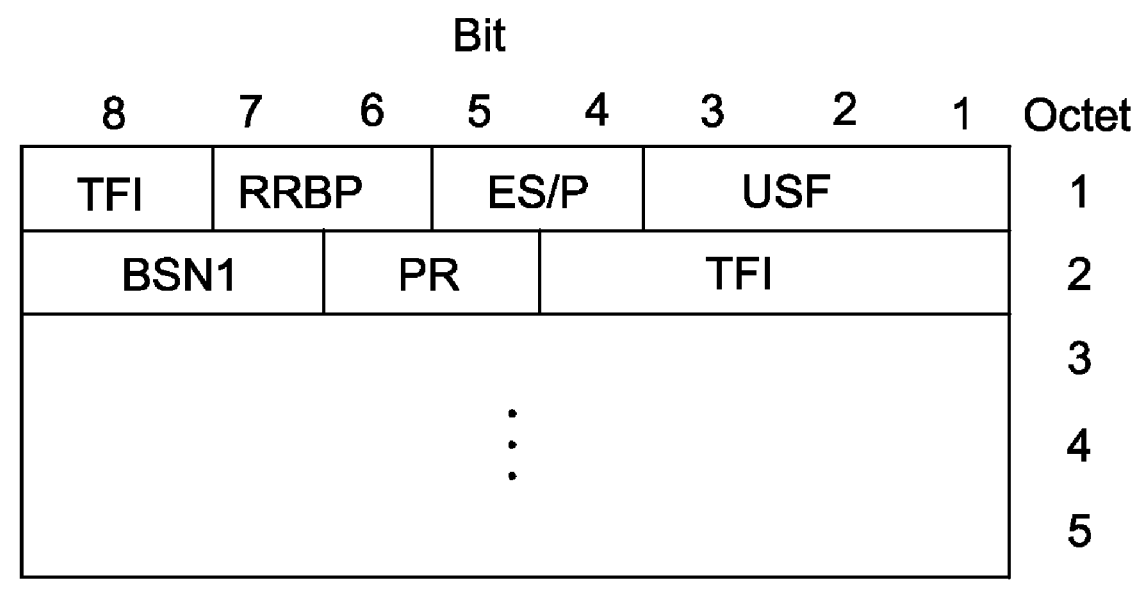

FIG. 5 illustrates a RLC/MAC block header for data transmission.

Referring to FIG. 5, a TFI is always included in octets 1 and 2 of a RLC/MAC block header. The octet is a 8-bit sequence. Upon data transmission, a MS can identify a radio block through the TFI included in the RLC/MAC block header. Thus, when the TFI identifies the MS, the MS reports channel quality for the radio block to a network.

When a MS calculates channel quality and reports the channel quality to a network, the network determines a MCS that is most suitable under current wireless environment by reference to the channel quality and sends the determined MCS to the MS. From a viewpoint of the network, it is necessary to receive lots of information as possible in order to determine optimal MCS. It is necessary to always report channel quality not only in data transmission, but also in control message transmission. This is further necessary when data and the control message are modulated using different modulation schemes. For example, it is assumed that two kinds of modulation schemes, such as GMSK and 8-PSK, are used. In the case where data is modulated using 8-PSK and a control message is modulated using GMSK, if only channel quality for the data is reported, channel quality for the 8-PSK (for example, 8PSK_MEAN_BEP and 8PSK_CV_BEP) is reported, but channel quality for the GMSK is not reported. Since the network cannot know channel information for the GMSK, the performance of link adaptation can be degraded.

In order for report channel quality for a control message, the TFI in the control block can be confirmed in various ways. To this end, layers of radio interface protocol are described below.

Figure 6:
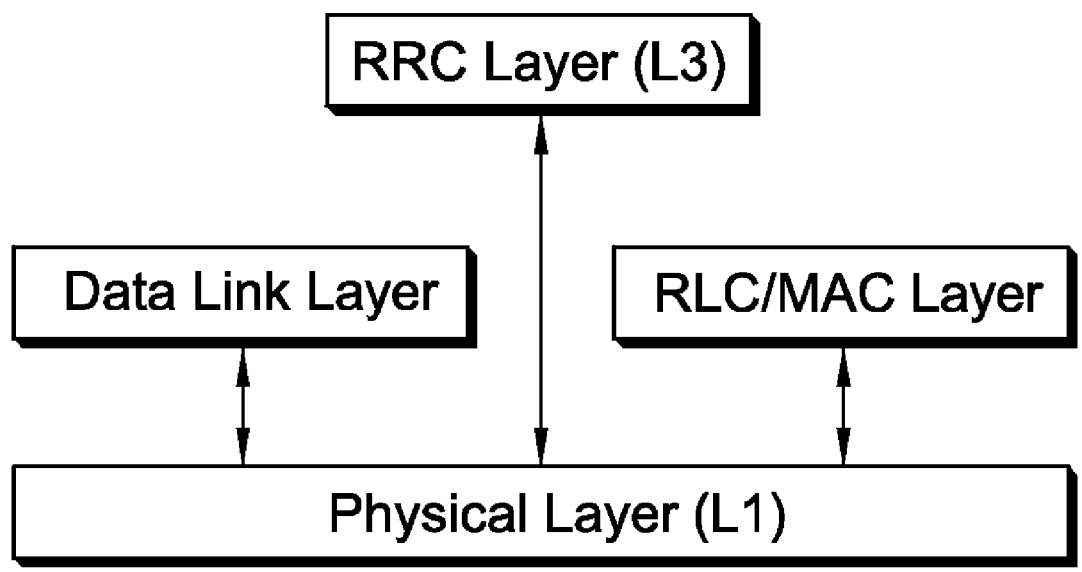
FIG. 6 is a conceptual view illustrating layers of a radio interface protocol.

FIG. 6 is a conceptual view illustrating layers of radio interface protocol.

Referring to FIG. 6, layers of radio interface protocol between a MS and a network can include a L1 layer, a L2 layer, and a L3 layer on the basis of three lower layers of an Open System Interconnection (OSI) system that has been widely known in the communication system. Of them, a physical layer belonging to the L1 layer provides an information transfer service employing a physical channel. A Radio Resource Control (RRC) layer belonging to the L3 layer functions to control radio resources between the MS and the network. RR messages are exchanged between the MS and the network in the RRC layer.

The physical layer (i.e., the L1 layer) is the lowest layer of the OSI reference model and supports all functions necessary to transmit bit streams on a physical entity. The physical layer is interfaced with a data link layer and a RLC/MAC layer.

Data are moved through a physical channel between different physical layers (i.e., physical layers of a transmitter and a receiver).

Whether to report channel quality is decided according to whether the TFI is confirmed in the L1 layer or the RLC/MAC layer. Since channel quality measurement is performed in the L1 layer, whether to report channel quality of a corresponding control block can be decided according to whether the TFI included in the RLC/MAC control block is confirmed in the L1 layer or the RLC/MAC layer.

In an embodiment, a TFI can be included in the header of the downlink RLC/MAC control block. Since the header of the RLC/MAC control block can be decoded in the L1 layer, TFI decoding is possible. Therefore, the L1 layer can confirm the TFI directly and report channel quality.

FIG. 7 shows an example of a downlink RLC/MAC control block.

Referring to FIG. 7, a TFI is included in an octet 2 of the downlink RLC/MAC control block. The TFI is disposed in the header so that the L1 layer can confirm the TFI. The TFI may be disposed in any position in the MAC header.

In another embodiment, a TFI can be confirmed not in the L1 layer, but in the RLC/MAC layer. Even though the TFI is not included in the header of the RLC/MAC control block, the TFI is included in control message contents. At this time, the L1 layer cannot confirm the control message contents since the control message contents cannot be decoded in the L1 layer. The control message contents can be decoded in the RLC/MAC layer (i.e., an upper layer of the L1 layer). When the RLC/MAC layer confirms the TFI, channel quality for the control block can be reported.

In still another embodiment, a TFI included in the control message contents can be confirmed in the L1 layer. For example, the control message contents can be decoded in the L1 layer so that the TFI included in the control message contents can be confirmed. Thus, channel quality for the control block can be reported.

Figure 8:
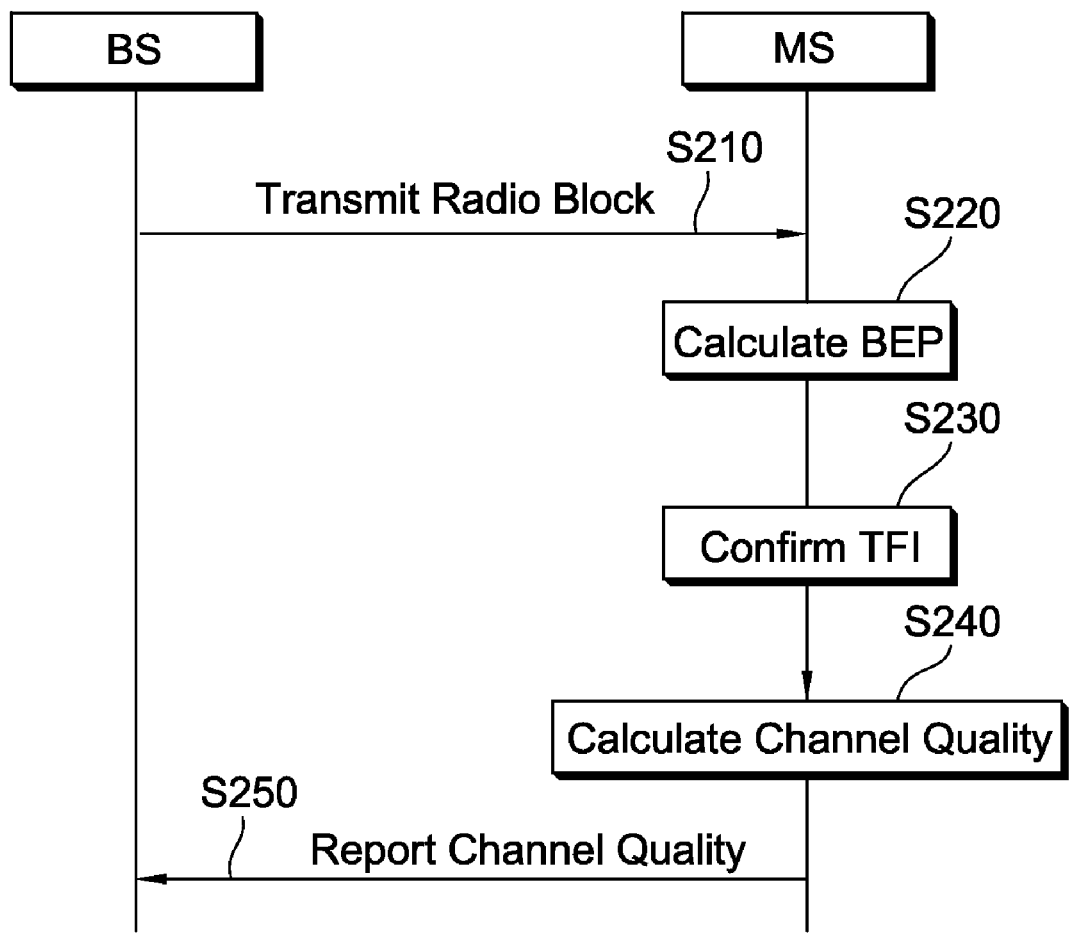
FIG. 8 is a flowchart illustrating a method of reporting channel quality according to another embodiment of the present invention.

FIG. 8 is a flowchart illustrating a method of reporting channel quality according to another embodiment of the present invention.

Referring to FIG. 8, a BS (or a network) transmits a radio block to a MS (S210). The radio block can be allocated for a control block including a control message.

The MS calculates a BEP of the radio block (S220). The BEP includes a mean BEP and a CV BEP, which can be calculated by the Equations 1 and 2, respectively.

The MS determines whether the control block includes an identifier belonging to itself (for example, a TFI belonging to the MS) (S230). The MS determines whether the radio block is a radio block indicating itself based on the TFI.

The MS that has identified by the TFI calculates channel quality (S240). The MS calculates channel quality of the radio block allocated for the control block. The channel quality is calculated by averaging the BEP of each radio block per channel and per modulation scheme. The channel quality can be calculated using the Equations 6 and 7.

The MS reports the channel quality to the BS (S250). The BS can determine a MCS based on the reported channel quality and inform the MS of the determined MCS.

Figure 9:
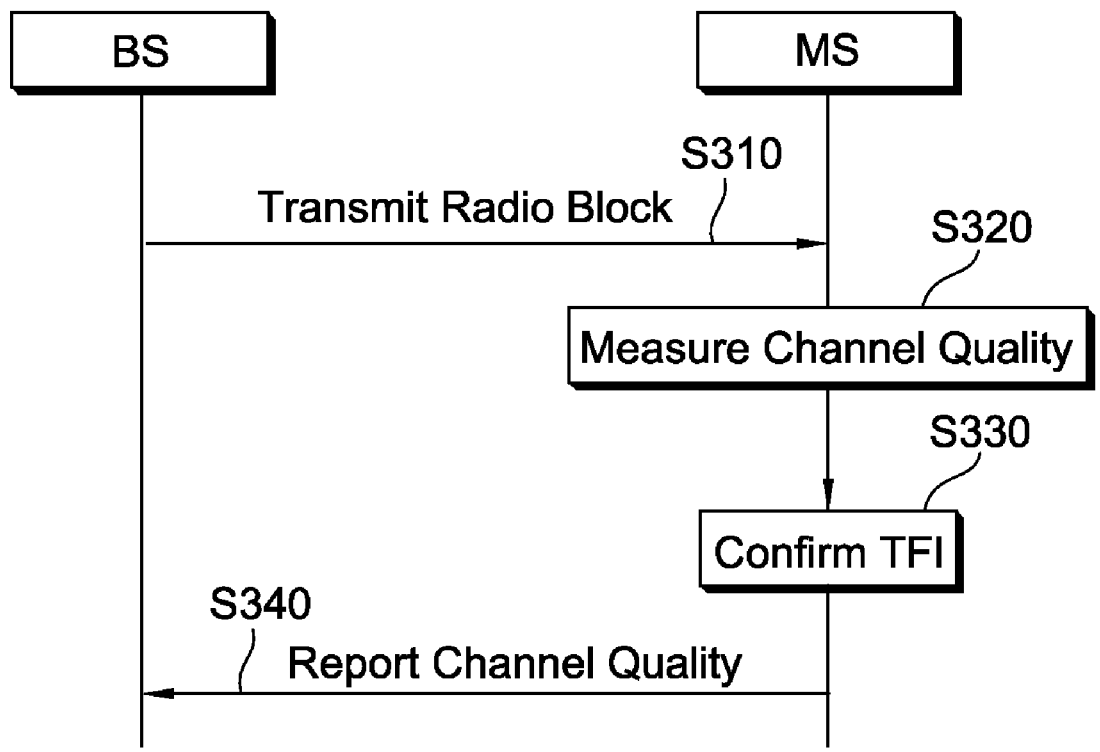
FIG. 9 is a flowchart illustrating a method of reporting channel quality according to still another embodiment of the present invention.

FIG. 9 is a flowchart illustrating a method of reporting channel quality according to still another embodiment of the present invention.

Referring to FIG. 9, a BS (or a network) transmits a radio block to a MS (S310). The radio block can be allocated for a control block which includes a header and a control message.

The MS calculates channel quality of the radio block (S320). The channel quality is calculated by averaging the BEP of each radio block per channel and per modulation scheme. The channel quality is calculated using the Equations 6 and 7. The MS measures channel quality of the entire radio blocks that have been successfully decoded by itself.

The MS determines whether the radio block is a radio block including an identifier belonging to itself (for example, a TFI belonging to the MS) (S330). The MS determines whether the radio block is a radio block indicating itself based on the TFI.

The MS reports the channel quality of the radio block indicating itself to the BS (S340). The BS can determine a MCS based on the reported channel quality and inform the MS of the determined MCS.

A mobile station can measure channel quality for its own control block. By reporting channel quality for the control block, link adaptation process can be more effectively performed.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

What is claimed is:

1. A method of enabling a mobile station to report channel quality in a wireless communication system, the method comprising:

receiving a radio block allocated for a control block, the control block comprising a header and a control message and the header comprising an identifier;

measuring channel quality parameters for the radio block allocated for the control block when the identifier identifies the mobile station; and reporting channel quality over a reporting period, wherein measuring the channel quality parameters for the radio block comprises:

determining a mean Bit Error Probability (BEP) for the radio block; and determining a coefficient of variance of BEP (CV BEP) for the radio block, wherein the channel quality comprises at least one overall mean BEP and at least one overall CV BEP, wherein the at least one overall mean BEP is determined by averaging BEP quality parameters according to a modulation scheme over all assigned channels after determining the BEP quality parameters by averaging a mean BEP for the radio block over the reporting period, and wherein the at least one overall CV BEP is determined by averaging CV BEP quality parameters according to a modulation scheme over all assigned channels after determining CV BEP quality parameters by averaging a CV BEP for the radio block over the reporting period.

2. The method of claim 1, further comprising:
receiving a radio block allocated for a data block, the data block comprising a header and upper layer data, the header of the data block comprising an identifier; and
measuring channel quality for the radio block allocated for the data block when the identifier in the header of the data block identifies the mobile station.

3. The method of claim 2, wherein the radio block allocated for the control block and the radio block allocated for the data block are modulated with different modulation scheme.

4. The method of claim 3, wherein the radio block allocated for the control block is modulated with GMSK (Gaussian Minimum Shift Keying) and radio block allocated for the data block is modulated with 8-PSK (Phase Shift Keying).

5. The method of claim 1, wherein the identifier is a TFI (Temporary Flow Identity).

6. The method of claim 1, wherein the control block is a RLC (Radio Link Control)/MAC (Medium Access Control) control block.

7. The method of claim 1, wherein the radio block is modulated with a modulation scheme that conforms to the standard for EGPRS (Enhanced General Packet Radio Service).

8. A method of receiving channel quality in a wireless communication system, the method comprising:
transmitting a radio block allocated for a control block, the control block comprising a header and at least one control message and the header comprising an identifier which identifies a mobile station to report channel quality; and
receiving channel quality from the mobile station,
wherein the mobile station measures the channel quality by:
determining a mean Bit Error Probability (BEP) for the radio block; and
determining a coefficient of variance of BEP (CV BEP) for the radio block, and
wherein the channel quality comprises at least one overall mean BEP and at least one overall CV BEP,
wherein the at least one overall mean BEP is determined by averaging BEP quality parameters according to a modulation scheme over all assigned channels after determining the BEP quality parameters by averaging a mean BEP for the radio block over a reporting period, and
wherein the at least one overall CV BEP is determined by averaging CV BEP quality parameters according to a modulation scheme over all assigned channels after determining the CV BEP quality parameters by averaging a CV BEP for the radio block over the reporting period.

9. The method of claim 8, the method further comprising selecting a modulation and coding scheme (MCS) for the radio block based on the received channel quality.

10. A wireless device comprising:
an RF (Radio Frequency) unit configured to transmit and receive radio blocks; and
a processor coupled to the RF unit and configured to:
measure channel quality parameters of a radio block for a control block, the control block comprising a header and at least one control message and the header comprising an identifier which identifies a mobile station, and
report channel quality over a reporting period,
wherein the channel quality parameters include a mean Bit Error Probability (BEP) for the radio block and a coefficient of variance of BEP (CV BEP) for the radio block,
wherein the channel quality comprises at least one overall mean BEP and at least one overall CV BEP,
wherein the at least one overall mean BEP is determined by averaging BEP quality parameters according to a modulation scheme over all assigned channels after determining the BEP quality parameters by averaging a mean BEP for the radio block over the reporting period, and
wherein the at least one overall CV BEP is determined by averaging CV BEP quality parameters according to a modulation scheme over all assigned channels after determining the CV BEP quality parameters by averaging a CV BEP for the radio block over the reporting period.

* * * * *